(12) United States Patent
Mochizuki et al.

(10) Patent No.: US 11,390,268 B2
(45) Date of Patent: Jul. 19, 2022

(54) CONTROL DEVICE AND CONTROL METHOD FOR VEHICLE

(71) Applicants: JATCO Ltd, Fuji (JP); NISSAN MOTOR CO., LTD., Yokohama (JP)

(72) Inventors: Masaharu Mochizuki, Atsugi (JP); Yoshimasa Nishihiro, Zama (JP); Takashi Enomoto, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 345 days.

(21) Appl. No.: 16/636,826

(22) PCT Filed: Jul. 27, 2018

(86) PCT No.: PCT/JP2018/028299
§ 371 (c)(1),
(2) Date: Feb. 5, 2020

(87) PCT Pub. No.: WO2019/031278
PCT Pub. Date: Feb. 14, 2019

(65) Prior Publication Data
US 2020/0361445 A1 Nov. 19, 2020

(30) Foreign Application Priority Data
Aug. 7, 2017 (JP) .............................. JP2017-152502

(51) Int. Cl.
*B60W 20/40* (2016.01)
*B60W 10/02* (2006.01)
(Continued)

(52) U.S. Cl.
CPC ............. *B60W 20/40* (2013.01); *B60K 17/02* (2013.01); *B60W 10/02* (2013.01);
(Continued)

(58) Field of Classification Search
CPC .... B60W 10/02; B60W 10/026; B60W 10/06; B60W 10/08; B60W 20/40;
(Continued)

(56) References Cited

U.S. PATENT DOCUMENTS

2013/0023379 A1* 1/2013 Bucknor ............. B60W 10/023
60/330
2015/0283993 A1* 10/2015 Takano ............... B60W 10/107
180/65.265
(Continued)

FOREIGN PATENT DOCUMENTS

JP 2000-071815 A 3/2000

*Primary Examiner* — Richard W Ridley
*Assistant Examiner* — Aimee Tran Nguyen
(74) *Attorney, Agent, or Firm* — Foley & Lardner LLP

(57) ABSTRACT

A control device for a vehicle having: an engine; a torque converter having a lock-up clutch; an engagement element disposed downstream of the torque converter; a drive shaft disposed downstream of the engagement element; and an electric motor disposed downstream of the engagement element, and connected to the drive shaft includes a control portion adapted to: in a case where an electric travel mode in which the lock-up clutch and the engagement element are disengaged is switched to an engine travel mode in which the lock-up clutch is disengaged and the engagement element is engaged, decrease driving torque of the electric motor after engagement of the engagement element; and gradually decrease the driving torque of the electric motor while gradually increasing driving torque of the engine after the driving torque of the electric motor is decreased.

6 Claims, 6 Drawing Sheets

(51) Int. Cl.
*B60W 10/06* (2006.01)
*B60W 10/08* (2006.01)
*B60W 30/19* (2012.01)
*B60K 17/02* (2006.01)

(52) U.S. Cl.
CPC .......... *B60W 10/026* (2013.01); *B60W 10/06* (2013.01); *B60W 10/08* (2013.01); *B60W 30/19* (2013.01); *B60W 2510/0208* (2013.01); *B60W 2510/0233* (2013.01); *B60W 2510/0241* (2013.01); *B60W 2510/1015* (2013.01); *B60W 2710/021* (2013.01); *B60W 2710/024* (2013.01); *B60W 2710/0644* (2013.01); *B60W 2710/0666* (2013.01); *B60W 2710/083* (2013.01)

(58) Field of Classification Search
CPC ..... B60W 2030/203; B60W 2030/206; B60W 2510/0208; B60W 2510/0233; B60W 2510/0241; B60W 2710/021; B60W 2710/024; B60W 2710/0666; B60W 2710/083; B60K 17/02
See application file for complete search history.

(56) References Cited

U.S. PATENT DOCUMENTS

2016/0090078 A1* 3/2016 Satomura .............. B60W 20/50 903/946
2016/0368474 A1* 12/2016 Komuro ................ B60K 6/387

\* cited by examiner

CONTROL DEVICE AND CONTROL METHOD FOR VEHICLE

TECHNICAL FIELD

The present invention relates to control for a vehicle including an engine and an electric motor which serve as power sources.

BACKGROUND ART

There is a known hybrid vehicle including an engine, an electric motor connected to a primary pulley of a continuously variable transmission, and an engagement element adapted to disconnect power transmission between the engine and the continuously variable transmission, in which an engine travel mode using motive power of the engine and an electric travel (hereinafter, also called as EV travel) mode using motive power of the electric motor can be selected. JP2000-71815A discloses control for suppressing a shock occurring in association with mode switching at the time of shifting from the EV travel mode to the engine travel mode in the hybrid vehicle of the above configuration. Specifically, JP2000-71815A discloses torque switching control of suppressing torque variation transmitted to a drive wheel by starting the engine in a state where the engagement element is disengaged, limiting torque of the engine after start of the engine, and gradually decreasing torque of the electric motor while gradually increasing the torque of the engine after the engagement element is engaged.

SUMMARY OF INVENTION

In the configuration described in the above document, no torque converter is arranged between the engine and the continuously variable transmission. However, from a viewpoint of simplifying control of engaging and disengaging the engagement element, improving durability of the engagement element, etc., a torque converter may be provided.

However, in a case where a torque converter is provided, and when the control of Patent Document 1 is executed in a state where a lock-up clutch is disengaged, despite the torque of the engine being limited after the start of the engine, torque on the output side of the torque converter is increased by a torque amplifying action of the torque converter after engagement of the engagement element, and there is a possibility that a shock occurs.

Thus, an object of the present invention is to suppress a shock occurring at the time of shifting from an EV travel mode to an engine travel mode in a state where a lock-up clutch is disengaged in a configuration including a torque converter.

According to one embodiment of this invention, there is provided a control device for a vehicle having: an engine; a torque converter disposed in a power transmission route on the downstream of the engine, the torque converter having a lock-up clutch; an engagement element disposed in the power transmission route on the downstream of the torque converter; a drive shaft disposed in the power transmission route on the downstream of the engagement element; and an electric motor disposed in the power transmission route on the downstream of the engagement element, and connected to the drive shaft. The control device comprises a control portion adapted to: in a case where an electric travel mode in which the electric motor is rotated in a state where the lock-up clutch is disengaged and the engagement element is disengaged is switched to an engine travel mode in which the engine is rotated in a state where the lock-up clutch is disengaged and the engagement element is engaged, decrease driving torque of the electric motor after engagement of the engagement element; and gradually decrease the driving torque of the electric motor while gradually increasing driving torque of the engine after the driving torque of the electric motor is decreased.

According to another embodiment of this invention, there is provided a control method for a vehicle having: an engine; a torque converter disposed in a power transmission route on the downstream of the engine, the torque converter having a lock-up clutch; an engagement element disposed in the power transmission route on the downstream of the torque converter; a drive shaft disposed in the power transmission route on the downstream of the engagement element; and an electric motor disposed in the power transmission route on the downstream of the engagement element, and connected to the drive shaft. The control method comprises: in a case where an electric travel mode in which the electric motor is rotated in a state where the lock-up clutch is disengaged and the engagement element is disengaged is switched to an engine travel mode in which the engine is rotated in a state where the lock-up clutch is disengaged and the engagement element is engaged, decreasing driving torque of the electric motor after engagement of the engagement element; and gradually decreasing the driving torque of the electric motor while gradually increasing driving torque of the engine after the driving torque of the electric motor is decreased.

According to the above aspect, it is possible to suppress a shock occurring at the time of shifting from an EV travel mode to an engine travel mode in a state where the lock-up clutch is disengaged.

DESCRIPTION OF EMBODIMENTS

Hereinafter, an embodiment of the present invention will be described with reference to the attached drawings.

Figure 1:
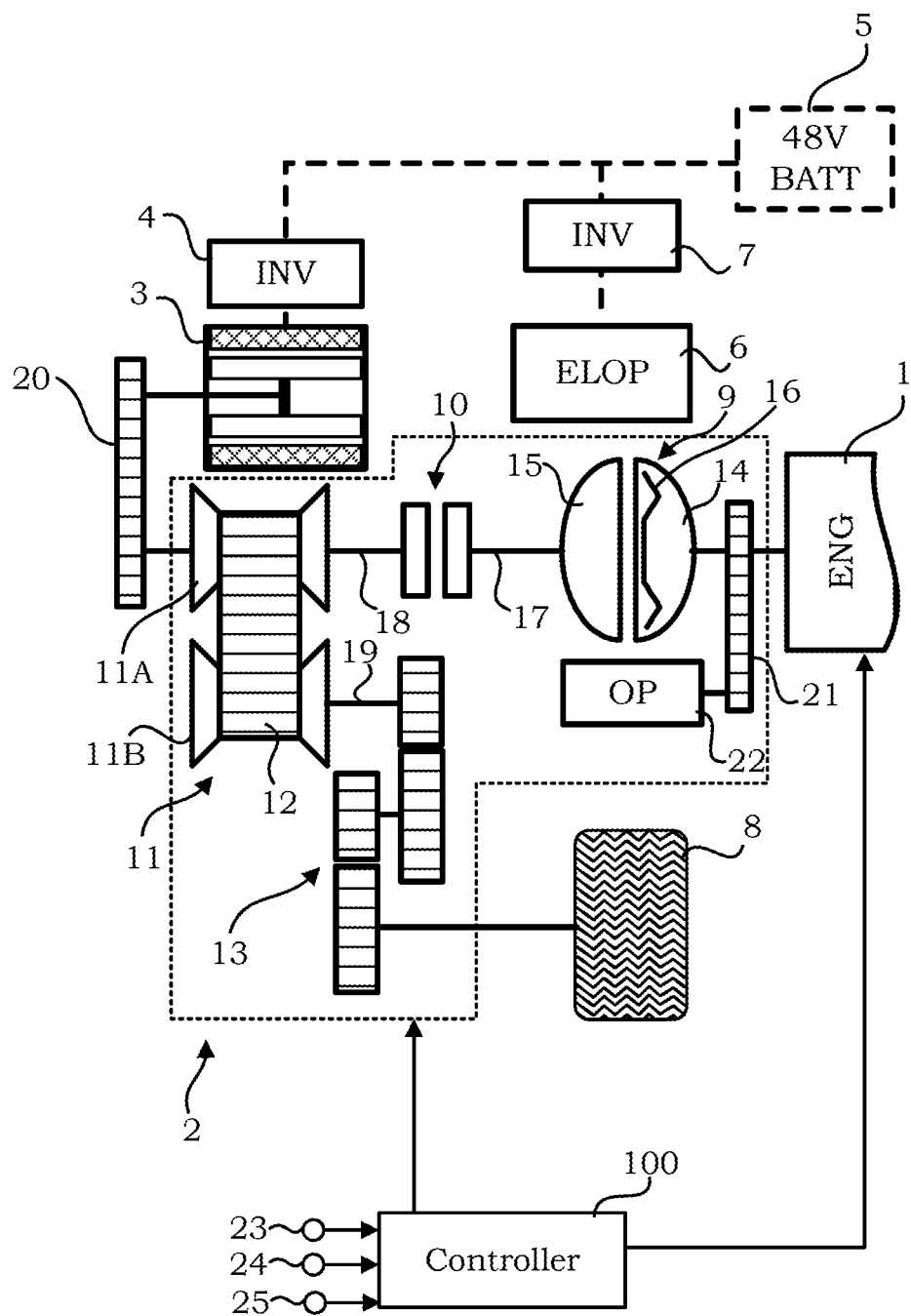
FIG. 1 is a schematic configuration diagram of a vehicle to which the present embodiment is applied.

FIG. 1 is a schematic configuration diagram of a hybrid vehicle (hereinafter, also simply called as the "vehicle") to which the present embodiment is applied. The vehicle includes an engine 1, a continuously variable transmission system 2, a motor generator (hereinafter, also called as the MG) 3, an electric oil pump 6, a drive wheel 8, and a controller 100.

The engine 1 is an internal combustion engine whose fuel is gasoline or diesel oil, and rotation speed, torque, etc. are controlled on the basis of commands from the controller 100.

The continuously variable transmission system 2 includes a torque converter 9, a forward clutch 10 serving as an engagement element, a variator 11, a final gear device 13, and an oil pump 22.

The torque converter 9 includes an impeller 14, a turbine 15, and a lock-up clutch 16. When the lock-up clutch 16 is engaged, an input shaft and an output shaft of the torque converter 9 are brought into a directly-connected state, and the input shaft and the output shaft are rotated at the same speed. Hereinafter, the lock-up clutch 16 will also be called as the LU clutch 16. Conditions to engage or disengage the LU clutch 16 will be described later.

The variator 11 includes a primary pulley 11A, a secondary pulley 11B, and a belt 12. In the variator 11, by controlling oil pressure supplied to the primary pulley 11A and oil pressure supplied to the secondary pulley 11B, contact radiuses between the pulleys 11A, 11B and the belt 12 are changed, and thereby, a speed ratio is changed.

The forward clutch 10 is arranged between the torque converter 9 and the primary pulley 11A. When the forward clutch 10 is engaged, driving torque of the engine 1 is transmitted to the primary pulley 11A via drive shafts 17, 18. Engagement and disengagement of the forward clutch 10 are switched by the controller 100 in accordance with a driving state. In the present specification, the driving torque indicates torque (positive torque) to rotate the drive wheel 8. Therefore, torque serving as a load to prevent rotation of the drive wheel 8 is negative torque. In the present specification, the driving torque may simply be called as the "torque".

In FIG. 1, the forward clutch 10 is arranged between the torque converter 9 and the primary pulley 11A. However, the present invention is not limited to this. A purpose of providing the forward clutch 10 is to disconnect a power transmission route from the engine 1 to the drive wheel 8. Thus, for example, the forward clutch 10 may be arranged between the secondary pulley 11B and the final gear device 13.

The MG 3 is connected to a rotation shaft of the primary pulley 11A via a transmission mechanism 20 including a belt and a pulley. The MG 3 is a synchronizing rotary electric machine in which a permanent magnet is embedded in a rotor and a stator coil is wound around a stator. The MG 3 is controlled by applying a three-phase alternating current created by an inverter 4 on the basis of a command from the controller 100. The MG 3 can be operated as an electric motor to be driven and rotated upon receiving supply of electric power from a battery 5. The battery 5 is a high voltage battery of, for example, 48 [V]. Therefore, by operating the MG 3 as an electric motor, EV travel can be performed. In a case where the rotor receives rotation energy from the engine 1 or the drive wheel 8, the MG 3 functions as a power generator adapted to generate electromotive power at both ends of the stator coil, so that the battery 5 can be charged. That is, the MG 3 can regenerate motion energy of the vehicle as electric power. Regeneration control is executed at the time of deceleration of the vehicle, etc.

The oil pump 22 is connected to an output shaft of the engine 1 via a transmission mechanism 21 including a belt and a pulley. Rotation of the engine 1 is inputted to the oil pump 22 and the oil pump is driven by utilizing part of motive power of the engine 1. Oil discharged from the oil pump 22 is supplied to a hydraulic control circuit of the vehicle including a shift circuit.

In addition to the oil pump 22, the vehicle also includes the electric oil pump 6. The electric oil pump 6 is controlled by applying a three-phase alternating current created by an inverter 7 on the basis of a command from the controller 100. Therefore, the electric oil pump 6 can be operated even in a case where the engine 1 is stopped. Oil discharged from the electric oil pump 6 is also supplied to the hydraulic control circuit. Therefore, the continuously variable transmission system 2 is controlled on the basis of the oil pressure supplied from at least the oil pump 22 or the electric oil pump 6.

A signal from an engine rotation speed sensor 25 adapted to detect engine rotation speed Ne, a signal from an accelerator pedal opening sensor 23 adapted to detect an accelerator pedal opening APO, and a signal from a brake sensor 24 adapted to detect brake pedal force based on a pressing amount BPR of a brake pedal are inputted to the controller 100.

The controller 100 is formed by a microcomputer including a central processing unit (CPU), a read-only memory (ROM), a random access memory (RAM), and an input/output interface (I/O interface). The controller 100 may be formed by plural microcomputers.

In the configuration described above, the motive power generated in the engine 1 is transmitted to the drive wheel 8 via the torque converter 9, the drive shaft 17, the forward clutch 10, the drive shaft 18, the variator 11, a drive shaft 19, and the final gear device 13. Motive power generated in the MG 3 is transmitted to the drive wheel 8 via the variator 11, the drive shaft 19, and the final gear device 13.

The controller 100 switches between an engine travel mode in which the vehicle travels by the motive power of the engine 1 and an EV travel mode in which the vehicle travels by the motive power of the MG 3 in accordance with the driving state. The controller 100 engages the forward clutch 10 in the engine travel mode, and disengages the forward clutch 10 in the EV travel mode.

Figure 2:
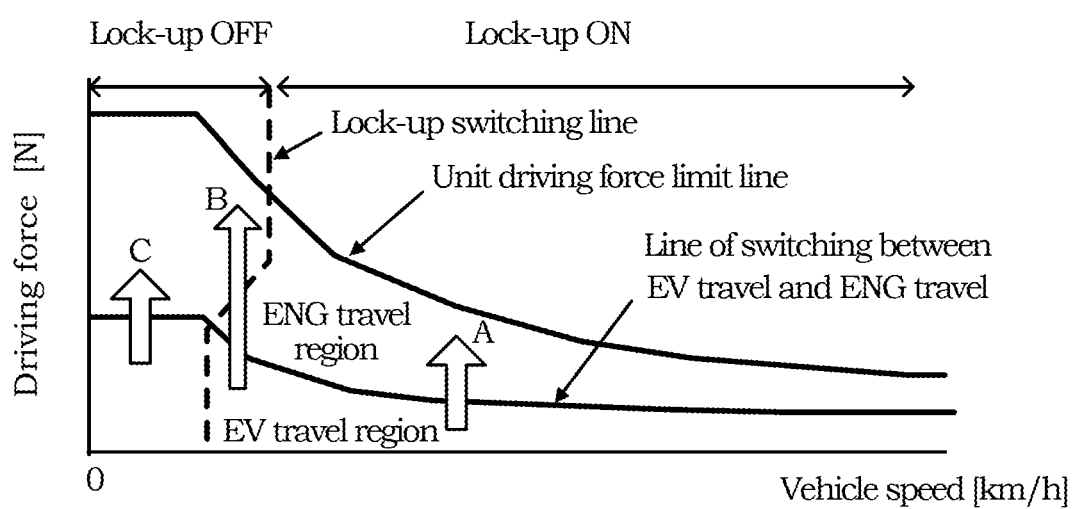
FIG. 2 is a driving region map showing a travel mode for each driving state.

FIG. 2 is a driving region map showing a lock-up switching line to switch engagement and disengagement of the LU clutch 16, and a line of switching between an engine travel region and an EV travel region. The horizontal axis indicates vehicle speed, and the vertical axis indicates driving force. The driving force of the vertical axis may be replaced with the accelerator pedal opening.

As shown in the figure, the EV travel mode and the engine travel mode are switched mainly in accordance with requested driving force. The engagement and the disengagement of the LU clutch 16 are switched mainly in accordance with the vehicle speed. In the engine travel mode, torque assist may be performed by the MG 3.

For switching from the EV travel mode to the engine travel mode, there are three patterns including Patterns A to C indicated by arrows in the figure. Pattern A is switching from an EV travel mode in which the LU clutch 16 is in an engaged (ON) state to an engine travel mode in which the LU clutch 16 is in an engaged state. Pattern B is switching from the EV travel mode in which the LU clutch 16 is in an engaged state to an engine travel mode in which the LU clutch 16 is in a disengaged (OFF) state. Pattern C is switching from an EV travel mode in which the LU clutch 16 is in a disengaged state to the engine travel mode in which the LU clutch 16 is in a disengaged state.

At the time of switching from the EV travel mode to the engine travel mode, the controller 100 switches the forward clutch 10 from a disengaged state to an engaged state. At this time, in order to suppress a shock occurring in association with the engagement of the forward clutch 10, the controller 100 executes rotation synchronization control of the forward clutch 10. The rotation synchronization control described above is control of decreasing a difference between rotation speed on the input side of the forward clutch 10 and rotation speed on the output side so that no shock occurs or a shock occurs at an acceptable level. Specifically, by increasing the engine rotation speed, rotation speed of the drive shaft 17 on the input side of the forward clutch 10 is increased and brought close to rotation speed of the drive shaft 18 on the output side of the forward clutch 10.

Figure 3:
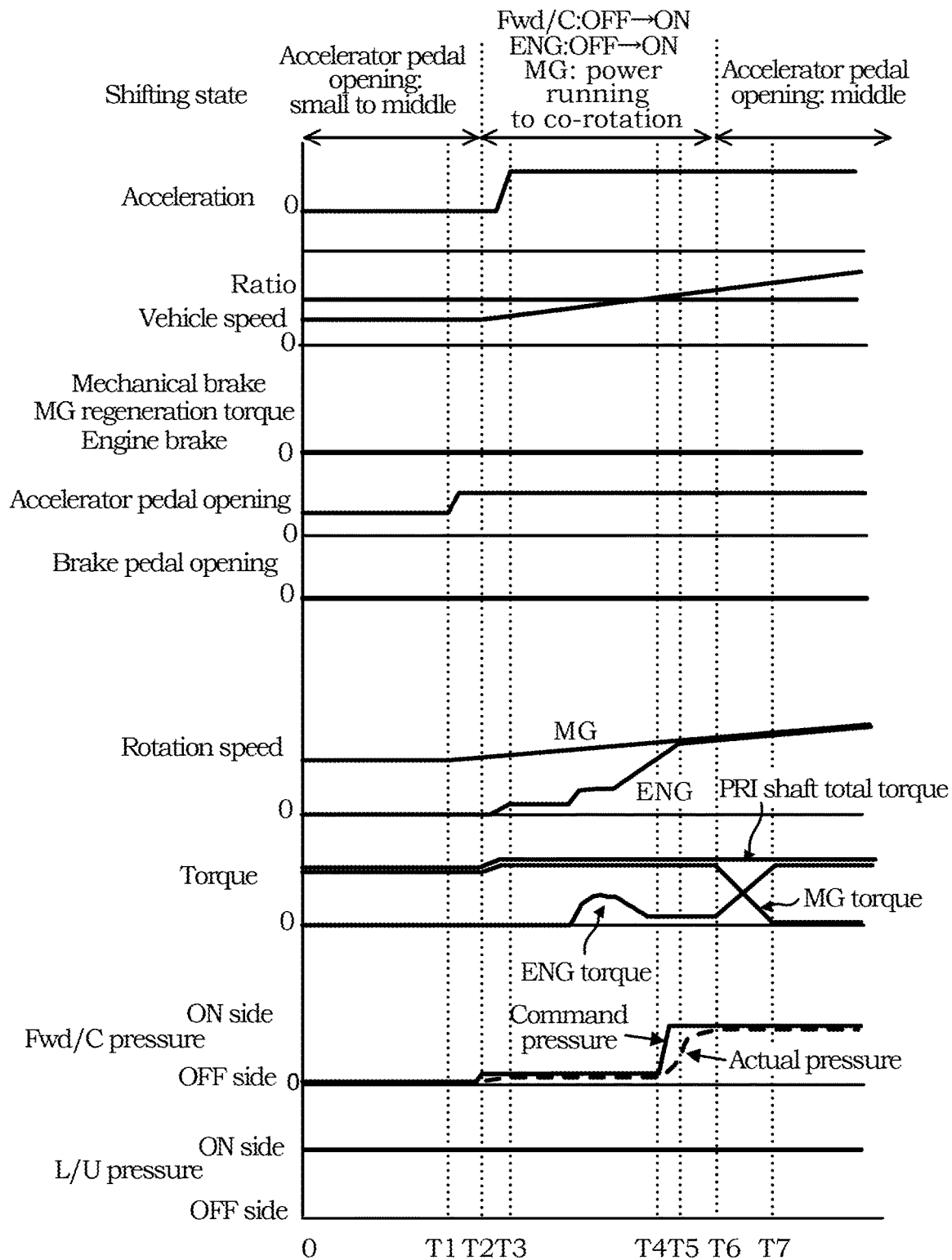
FIG. 3 is a timing chart showing an example of control in a case where the travel mode is shifted by Pattern A of FIG. 2.

FIG. 3 is a timing chart of a case where the switching of Pattern A is performed.

When an accelerator is pressed down at timing T1, the controller 100 decides switching from the EV travel mode to the engine travel mode. At timing T2, the controller 100 increases oil pressure to standby oil pressure in preparation for the engagement of the forward clutch 10, and also increases the torque of the MG 3 in order to enhance acceleration. After that, the controller 100 starts cranking in order to start the engine 1. At timing T3 or later, when the engine 1 is started, the controller 100 limits the torque of the engine 1 by retarding ignition timing, etc. while increasing the engine rotation speed for rotation synchronization. This limitation of the torque of the engine 1 is performed in order to suppress stretching feel or a shock occurring at the time of engaging the forward clutch 10.

Since the LU clutch 16 is in an engaged state in Pattern A, rotation speed of the turbine 15, that is, the rotation speed of the drive shaft 17 serving as a shaft on the input side of the forward clutch 10 is the same as the engine rotation speed. The rotation speed of the drive shaft 18 serving as a shaft on the output side of the forward clutch 10 is the same as the rotation speed of the MG 3.

At timing T4 when a difference between the rotation speed of the MG 3 and the rotation speed of the turbine 15 becomes smaller than a threshold value, the controller 100 starts the engagement of the forward clutch 10. When the engagement of the forward clutch 10 is completed at timing T5, the controller 100 gradually increases the torque of the engine 1 from timing T6 when the limitation of the torque of the engine 1 is ended, and also gradually decreases the torque of the MG 3. At this time, the torque of the engine 1 and the torque of the MG 3 are controlled so that torque (PRI total torque) obtained by adding the torque of the engine 1 and the torque of the MG 3 is not varied. When the torque of the MG 3 becomes zero at timing T7, the torque switching control is ended.

Figure 4:
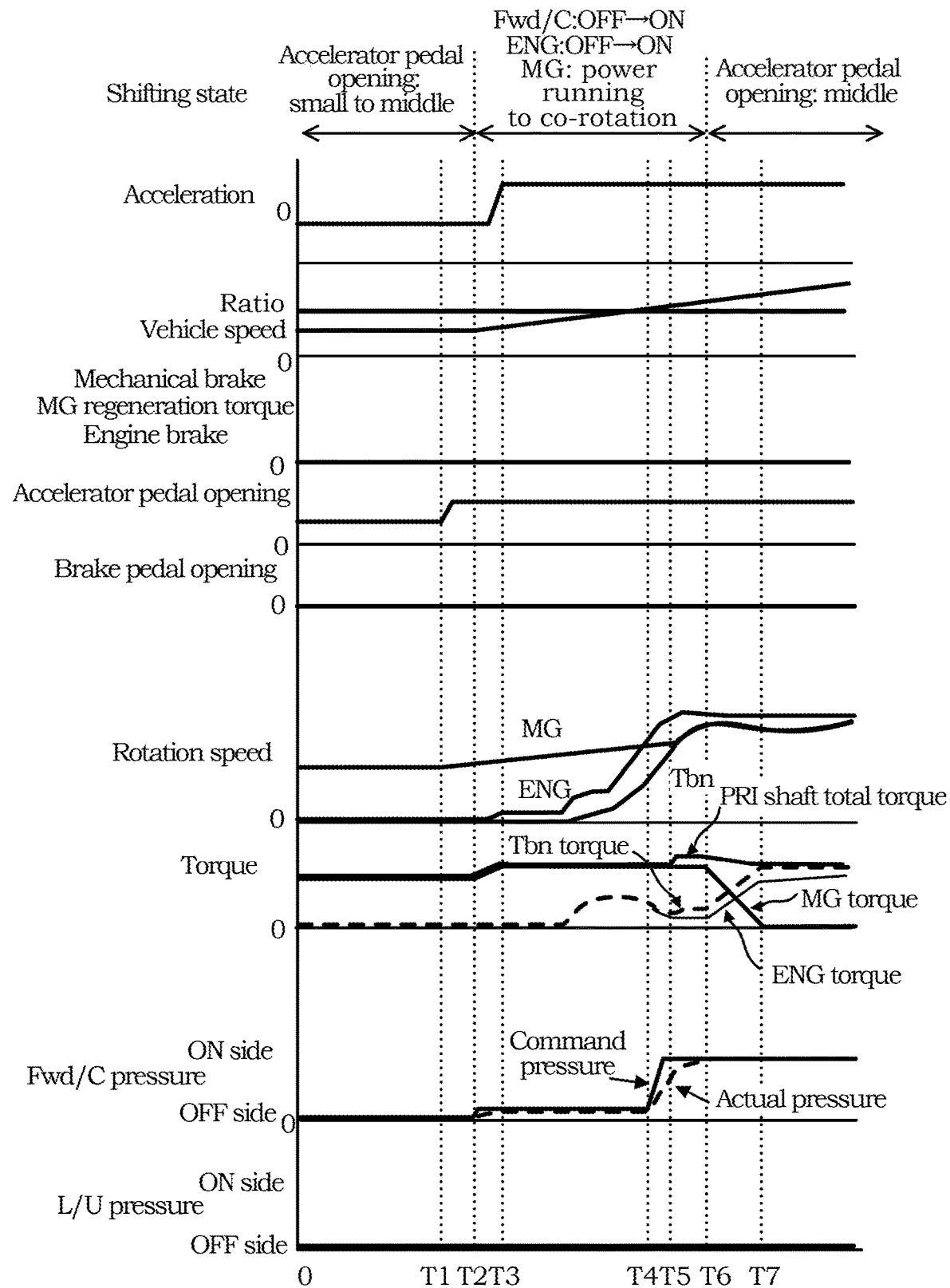
FIG. 4 is a timing chart showing an example of control in a case where the travel mode is shifted by Pattern C of FIG. 2.

FIG. 4 is a timing chart of a case where the switching of Pattern C is performed by control similar to the case of Pattern A. Differences from Pattern A will be mainly described.

In Pattern C, the LU clutch 16 is in a disengaged state in the EV travel mode. Thus, at timing T3 or later, the rotation speed of the turbine 15 is increased behind the engine rotation speed. Since the LU clutch 16 is in a disengaged state, at the timing T5 when the engagement of the forward clutch 10 is completed, the torque of the turbine (Tbn torque in the figure) is larger than the torque of the engine 1 (crankshaft torque) by a torque amplifying amount of the torque converter 9. Therefore, at the timing T5, the PRI total torque is increased.

That is, despite the torque of the engine 1 being limited, the torque transmitted to the drive wheel 8 (PRI total torque) is increased by the torque amplifying action, and an uncomfortable feeling such as projecting feel or a shock is given to a driver.

As described above, when the control suitable for Pattern A in which the LU clutch 16 is in an engaged state is applied to Pattern C in which the LU clutch 16 is in a disengaged state, an uncomfortable feeling is given to the driver.

In a case of Pattern B, there is a possibility that the torque transmitted to the drive wheel 8 is varied depending on timing when the LU clutch 16 is disengaged. For example, when the LU clutch 16 is disengaged in a period immediately after completion of the engagement of the forward clutch 10 to end of torque switching, a difference is generated between the engine rotation speed and the rotation speed of the turbine 15, and in association with this, torque variation occurs.

Thus, in the present embodiment, in order to suppress the torque variation occurring in association with the above switching from the EV travel mode to the engine travel mode, control to be described below is executed.

Figure 5:
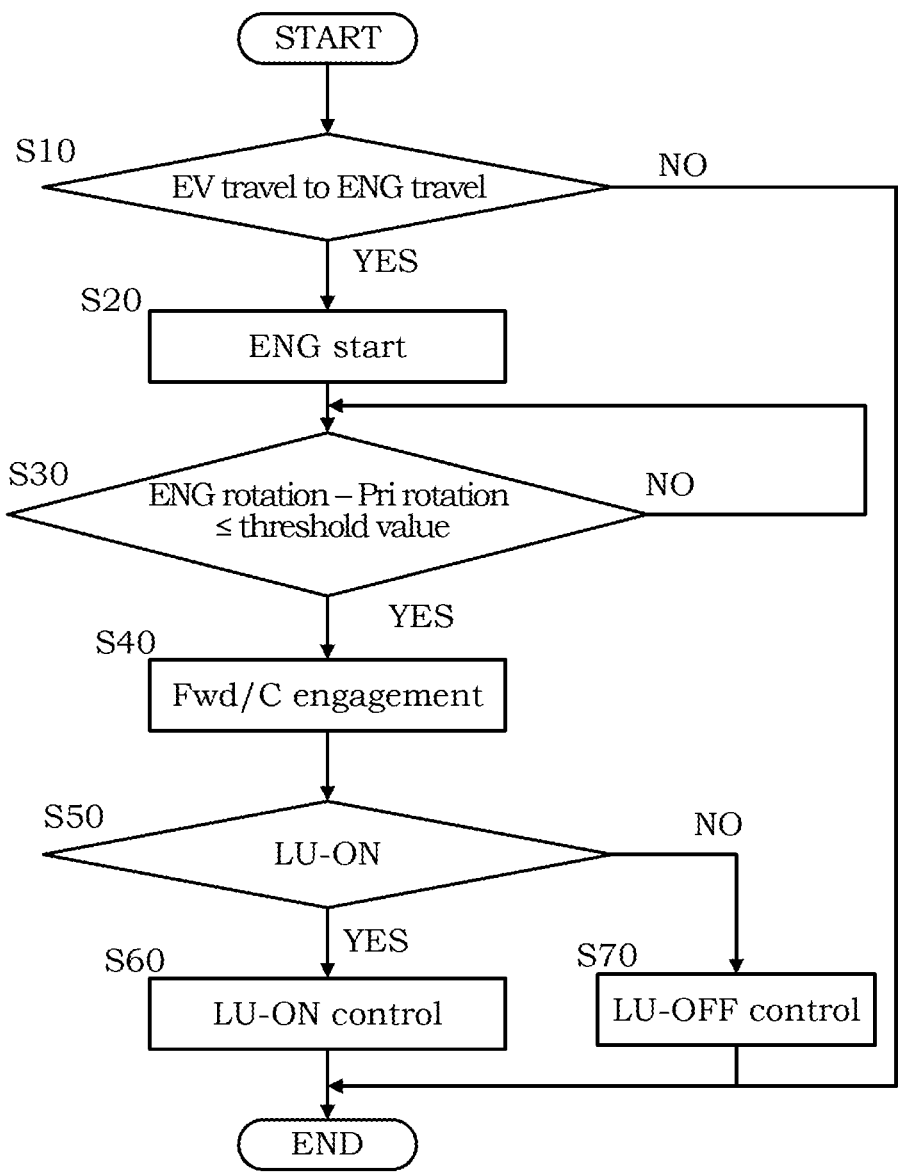
FIG. 5 is a flowchart showing a control routine to be executed by a controller in the present embodiment.

FIG. 5 is a flowchart showing a control routine to be executed by the controller 100.

In Step S10, the controller 100 determines whether or not there is a request to switch from the EV travel mode to the engine travel mode. In a case where there is a request to switch, processing of Step S20 is executed. In a case where there is no request to switch, the present routine is ended. Whether or not there is a request to switch is determined on the basis of the accelerator pedal opening and the vehicle speed. Specifically, determination is made by searching the map shown in FIG. 2 using requested driving force determined from the accelerator pedal opening and current vehicle speed.

In Step S20, the controller 100 starts control of starting the engine 1. After start of the engine, the controller 100 increases the engine rotation speed for the rotation synchronization described above while limiting the torque of the engine by retarding the ignition timing, etc.

Some time is required after a command to start the engine is delivered and before the engine 1 is started. Thus, in Step S20, the torque of the MG 3 may be increased in order to accelerate the vehicle.

In Step S30, the controller 100 determines whether or not a value obtained by subtracting the rotation speed of the primary pulley 11A from the engine rotation speed becomes a threshold value or less. This determination is to determine whether or not the rotation synchronization is ended, that is, whether or not the rotation speed on the input side of the forward clutch 10 is synchronized with the rotation speed on the output side.

For the purpose of the rotation synchronization, judgement is made desirably on the basis of a difference between the rotation speed of the turbine 15 and the rotation speed of the primary pulley 11A. However, when a sensor adapted to detect the rotation speed of the turbine 15 is added for the rotation synchronization, cost is increased. The rotation speed of the turbine 15 is equal to the engine rotation speed when the LU clutch 16 is engaged, and can be estimated from the engine rotation speed by considering a lag of the rotation speed in the torque converter 9 even when the LU clutch 16 is disengaged. Thus, the lag of the rotation speed in the torque converter 9 is obtained in advance, and in Step S30, whether or not the rotation synchronization is performed is determined using the engine rotation speed.

The larger the difference between the engine rotation speed and the rotation speed of the turbine 15 is, the larger threshold value used for the determination is set. This is because in a state where the LU clutch 16 is disengaged, the rotation speed of the turbine 15 is increased behind the engine rotation speed. That is, for example, when the threshold value is set to be zero, the rotation speed of the turbine 15 is not equal to rotation speed of the primary pulley 11A at time point when a difference between the engine rotation speed and the rotation speed of the primary pulley 11A becomes zero, and a shock occurs when the forward clutch 10 is engaged.

The controller 100 executes processing of Step S40 in a case where a determination result of Step S30 is YES, and repeats the determination of Step S30 in a case of NO.

In Step S40, the controller 100 engages the forward clutch 10. Prior to the engagement, the oil pressure of the forward clutch 10 is increased to the standby oil pressure. Timing when the oil pressure is increased to the standby oil pressure is matched with, for example, timing when the engine is started in Step S20.

In Step S50, the controller 100 determines whether or not the LU clutch 16 is in an engaged state. In an engaged state, engaged-state (LU-ON) control is executed in Step S60. In a disengaged state, disengaged-state (LU-OFF) control is executed in Step S70.

The engaged-state control to be executed in Step S60 is as follows.

First, the torque of the MG 3 is gradually decreased to be zero, and together with this, the torque of the engine 1 is gradually increased so that the PRI total torque is not varied. When the torque of the MG 3 becomes zero, that is, when the torque switching control is ended, the LU clutch 16 is disengaged. In a case where the LU clutch 16 is shifted from an engaged state to a disengaged state, and when the LU clutch 16 is disengaged in a period immediately after the engagement of the forward clutch 10 to the torque switching control, the torque variation described with FIG. 4 occurs.

When the LU clutch 16 is disengaged before the engagement of the forward clutch 10, the following problems occur. Firstly, control of torque on the output side of the torque converter 9, that is, the torque of the turbine 15 becomes difficult. Secondly, there is a need for increasing the rotation speed of the engine 1 as high as a lag amount in the torque converter 9 in order to increase the rotation speed on the output side of the torque converter 9, that is, the rotation speed of the turbine 15 to the rotation speed of the primary pulley 11A. Thus, problems such as useless fuel consumption and extension of time required before completion of the rotation synchronization occur.

Thus, in the engaged-state control, the LU clutch 16 is disengaged after the torque switching control is ended. Thereby, it is possible to solve the above problems.

In the disengaged-state control to be executed in Step S70, first, a difference between the torque of the turbine 15 and the torque of the engine 1 at the time of engaging the forward clutch 10 is estimated by a method to be described later, and when the forward clutch 10 is engaged, the torque of the MG 3 is decreased by this amount of the torque difference. After that, as well as the engaged-state control, the torque of the engine 1 is gradually increased while gradually decreasing the torque of the MG 3.

The method of estimating the difference between the torque of the turbine 15 and the torque of the engine 1 is as follows.

First, the difference between the engine rotation speed and the rotation speed of the turbine 15 (differential rotation) at the time of engaging the forward clutch 10 is estimated on the basis of the engine rotation speed. Torque for the torque amplifying action is estimated on the basis of the estimated differential rotation. The torque estimated thereby is an estimate value of the difference between the torque of the turbine 15 and the torque of the engine 1. The torque amplifying action is determined by a characteristic of the torque converter 9. Thus, the characteristic of the torque converter to be used is obtained in advance.

As described above, in the present embodiment, when the EV travel mode in which the LU clutch 16 is a disengaged state and the forward clutch 10 is in a disengaged state is switched to the engine travel mode in which the LU clutch 16 is in a disengaged state and the forward clutch 10 is an engaged state, the controller 100 starts the engagement of the forward clutch 10 and then decreases the torque of the MG 3. After the torque of the MG 3 is decreased, the torque switching control is started.

Next, actions and effects of a case where the control routine of FIG. 5 is executed will be described.

Figure 6:
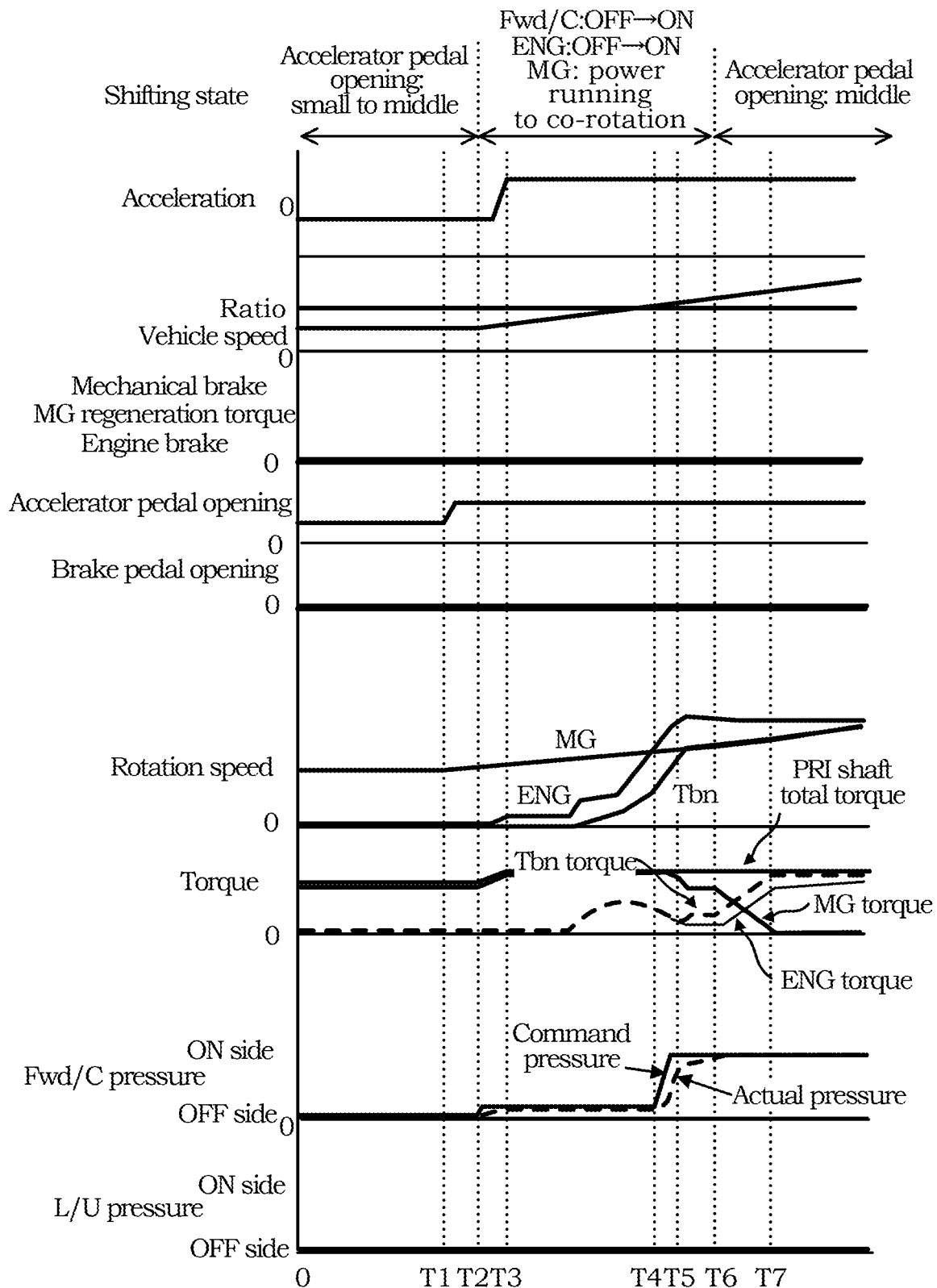
FIG. 6 is a timing chart of a case where the control routine of FIG. 5 is executed.

FIG. 6 is a timing chart of the case where the control routine of FIG. 5 is executed. Since a period from timing 0 to timing T4 and a period at timing T6 and later are similar to FIG. 4, the description will be omitted.

In the present embodiment, at timing T5 when the engagement of the forward clutch 10 is completed, the disengaged-state control described above is executed. That is, at the timing T5, the torque of the MG 3 is decreased by an amount of the difference between the torque of the engine 1 and the torque of the turbine 15. Thereby, the increase in the PRI shaft total torque occurring at the timing T5 in FIG. 4 is suppressed. That is, stretching feel or a shock occurring in association with the engagement of the forward clutch 10 is suppressed.

As described above, in the present embodiment, a control device for a vehicle having the engine 1, the torque converter 9 disposed in the power transmission route on the downstream of the engine 1, the torque converter having the LU clutch 16, the forward clutch 10 (engagement element) disposed in the power transmission route on the downstream of the torque converter 9, the drive shaft 18 disposed in the power transmission route on the downstream of the forward clutch 10, and the MG (electric motor) 3 disposed in the power transmission route on the downstream of the forward clutch 10, and connected to the drive shaft 18 is provided. This control device includes the controller 100 (control portion) adapted to, in a case where the EV travel mode in which the LU clutch 16 is in a disengaged state and the forward clutch 10 is in a disengaged state is switched to the engine travel mode in which the LU clutch 16 is in a disengaged state and the forward clutch 10 is in an engaged state, decrease the driving torque of the MG 3 after the engagement of the forward clutch 10, and gradually decrease the driving torque of the MG 3 while gradually increasing the driving torque of the engine 1 after the driving torque of the MG 3 is decreased.

As described above, by decreasing the driving torque of the MG 3 after the engagement of the forward clutch 10, it is possible to suppress variation of the PRI shaft total torque immediately after the engagement of the forward clutch 10. Thus, it is possible to suppress a shock occurring in association with the engagement of the forward clutch 10. After the forward clutch 10 is engaged while suppressing a shock by decreasing the driving torque of the MG 3, by gradually decreasing the driving torque of the MG 3 while gradually increasing the driving torque of the engine 1, it is possible to switch the torque while suppressing the torque variation transmitted to the drive wheel 8.

In the present embodiment, the controller 100 makes a torque decrease amount at the time of decreasing the driving torque of the MG 3 after the engagement of the forward clutch 10 an amount to cancel an increase amount of the torque on the output side of the torque converter 9 by the torque amplifying action of the torque converter 9 at the time of completing the engagement of the forward clutch 10. Thereby, an increase in the torque on the output side of the torque converter 9 immediately after the engagement of the forward clutch 10 is canceled. Thus, it is possible to maintain and fix the PRI shaft total torque and suppress a shock occurring in association with the engagement of the forward clutch 10.

In the present embodiment, in a case where the electric travel mode in which the LU clutch 16 is in an engaged state and the forward clutch 10 is in a disengaged state is switched to the engine travel mode in which the LU clutch 16 is in a disengaged state and the forward clutch 10 is in an engaged state, the controller 100 gradually decreases the driving torque of the MG 3 while gradually increasing the driving torque of the engine 1 after the engagement of the forward clutch 10, and then disengages the LU clutch 16. Thereby, it is possible to perform the torque switching control and disengage the LU clutch 16 while suppressing the variation of the PRI shaft total torque.

In the present embodiment, in a case where the EV travel mode is switched to the engine travel mode, the controller 100 engages the forward clutch 10 when the rotation synchronization is performed in the forward clutch 10. Thereby, it is possible to suppress a shock occurring in association with the engagement of the forward clutch 10.

The embodiment of the present invention is described above. However, the above embodiment only shows part of application examples of the present invention and does not intend to limit the technical scope of the present invention to the specific configurations of the above embodiment.

This application claims priority based on Japanese Patent Application No. 2017-152502 filed with the Japan Patent Office on Aug. 7, 2017, the entire contents of which are incorporated into this specification.

The invention claimed is:

1. A control device for a vehicle having:
an engine;
a torque converter disposed in a power transmission route on the downstream of the engine, the torque converter having a lock-up clutch;
an engagement element disposed in the power transmission route on the downstream of the torque converter;
a drive shaft disposed in the power transmission route on the downstream of the engagement element; and
an electric motor disposed in the power transmission route on the downstream of the engagement element, and connected to the drive shaft,
the control device comprising:
a controller configured to:
in a case where an electric travel mode in which the electric motor is rotated in a state where the lock-up clutch is disengaged and the engagement element is disengaged is switched to an engine travel mode in which the engine is rotated in a state where the lock-up clutch is disengaged and the engagement element is engaged,
decrease driving torque of the electric motor after engagement of the engagement element; and
gradually decrease the driving torque of the electric motor while gradually increasing driving torque of the engine after the driving torque of the electric motor is decreased.

2. The control device for the vehicle according to claim 1, wherein
the controller makes a torque decrease amount at the time of decreasing the driving torque of the electric motor after the engagement of the engagement element an amount to cancel an increase amount of torque on the output side of the torque converter by a torque amplifying action of the torque converter at the time of completing the engagement of the engagement element.

3. The control device for the vehicle according to claim 1, wherein
in a case where another electric travel mode in which the electric motor is rotated in a state where the lock-up clutch is engaged and the engagement element is disengaged is switched to the engine travel mode in which the engine is rotated in a state where the lock-up clutch is disengaged and the engagement element is engaged,
the controller gradually decreases the driving torque of the electric motor while gradually increasing the driving torque of the engine after the engagement of the engagement element, and then disengages the lock-up clutch.

4. The control device for the vehicle according to claim 1, wherein
in a case where the electric travel mode is switched to the engine travel mode, the controller engages the engagement element when rotation synchronization is performed in the engagement element.

5. A control method for a vehicle having:
an engine;
a torque converter disposed in a power transmission route on the downstream of the engine, the torque converter having a lock-up clutch;
an engagement element disposed in the power transmission route on the downstream of the torque converter;
a drive shaft disposed in the power transmission route on the downstream of the engagement element; and
an electric motor disposed in the power transmission route on the downstream of the engagement element, and connected to the drive shaft,
the control method comprising:
in a case where an electric travel mode in which the electric motor is rotated in a state where the lock-up clutch is disengaged and the engagement element is disengaged is switched to an engine travel mode in which the engine is rotated in a state where the lock-up clutch is disengaged and the engagement element is engaged,
decreasing driving torque of the electric motor after engagement of the engagement element; and
gradually decreasing the driving torque of the electric motor while gradually increasing driving torque of the engine after the driving torque of the electric motor is decreased.

6. A control device for a vehicle having:
an engine;
a torque converter disposed in a power transmission route on the downstream of the engine, the torque converter having a lock-up clutch;
an engagement element disposed in the power transmission route on the downstream of the torque converter;
a drive shaft disposed in the power transmission route on the downstream of the engagement element; and
an electric motor disposed in the power transmission route on the downstream of the engagement element, and connected to the drive shaft,
the control device comprising:
control means for:
in a case where an electric travel mode in which the electric motor is rotated in a state where the lock-up clutch is disengaged and the engagement element is disengaged is switched to an engine travel mode in which the engine is rotated in a state where the lock-up clutch is disengaged and the engagement element is engaged, decreasing driving torque of the electric motor after engagement of the engagement element; and gradually decreasing the driving torque of the electric motor while gradually increasing driving torque of the engine after the driving torque of the electric motor is decreased.

* * * * *